United States Patent

Kramer et al.

[15] 3,642,019
[45] Feb. 15, 1972

[54] APPARATUS FOR CONTROLLING THE FLOW FROM TWO OUTLETS

[72] Inventors: Manfred Kramer, Fellbach-Lindle; Heinz Flaschar, Ludwigsburg; Georg Antonulas, Stuttgart-Sillenbuch, all of Germany

[73] Assignee: Robert Bosch GmbH, Stuttgart, Germany

[22] Filed: May 28, 1970

[21] Appl No. 41,501

[30] Foreign Application Priority Data

June 28, 1969 Germany.....................P 19 32 994.3

[52] U.S. Cl..............................................137/101, 137/117
[51] Int. Cl...........................................................G05d 11/03
[58] Field of Search..................137/101, 115, 116, 117, 118, 137/119

[56] References Cited

UNITED STATES PATENTS

| 2,643,664 | 6/1953 | Willett | 137/101 |
| 2,859,762 | 11/1958 | Banker | 137/101 |
| 2,995,141 | 8/1961 | Hipp | 137/101 |
| 3,033,221 | 5/1962 | Strader | 137/101 |
| 3,160,167 | 12/1964 | Martin | 137/101 |

Primary Examiner—Robert G. Nilson
Attorney—Michael S. Striker

[57] ABSTRACT

A spring-biased regulating valve directs fluid from a pump at a constant pressure to a first outlet up to a certain amount required by a consumer apparatus, and directs at the same time excess fluid to a second outlet. When the pressure in the first outlet rises above the desired constant value, a biased control valve responds to the pressure increase and causes the regulating valve to direct all the fluid from the pump to the second outlet until the pressure in the first outlet has again its desired constant value.

6 Claims, 1 Drawing Figure

PATENTED FEB 15 1972  3,642,019
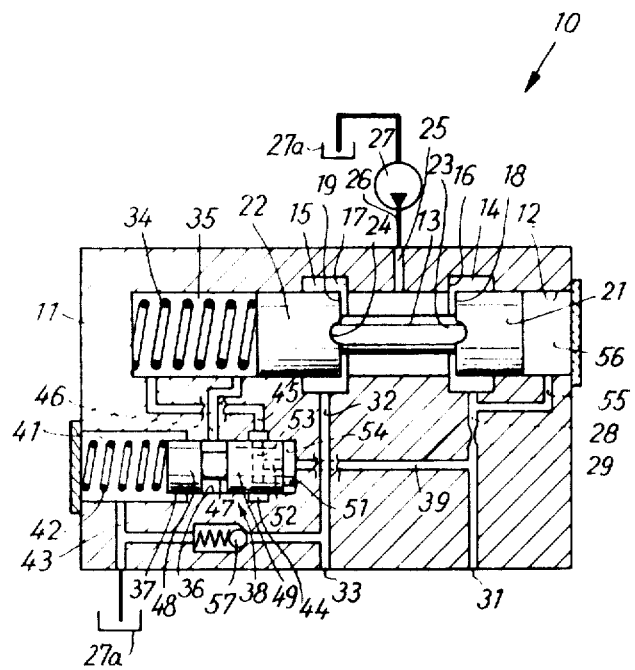
INVENTORS:
Manfred KRAMER
Heinz FLASCHAR
Georg ANTONULAS
By
[signature]
their ATTORNEY 3,642,019

APPARATUS FOR CONTROLLING THE FLOW FROM TWO OUTLETS

BACKGROUND OF THE INVENTION

The present invention relates to a valve arrangement of the type in which a first consumer receives a pressure fluid up to a certain amount, while excess amounts are supplied to a second consumer outlet.

The DAS 1,108,027 disclosed a regulating valve arrangement in which a constant amount of pressure fluid is directed to a first consumer, and the excess amount of fluid is directed to a second consumer. When the constant flow of fluid to the first consumer is interrupted, the valve also interrupts the flow to the second consumer outlet unless a pressure limiting valve is provided in the constant pressure consumer outlet. The constant amount of fluid flowing through this valve constitutes a substantial loss.

The U.S. Pat. No. 2,573,563 discloses an arrangement with a source of pressure fluid and two consumers of which one is supplied with a constant amount of fluid at a reduced pressure. The regulating valve controls only the constant flow of fluid, and cannot direct excess fluid to a second consumer.

SUMMARY OF THE INVENTION

It is one object of the invention to overcome the disadvantages of apparatus according to the prior art for controlling the flow from two outlets, and to provide an apparatus of simple construction which upon interruption of the consumer load, and while maintaining a predetermined pressure in the consumer circuit, provides the entire amount of pressure fluid unthrottled to the second consumer.

With these objects in view, and in accordance with the invention, a spring-biased control valve operated by pressure fluid of the first consumer outlet, is hydraulically connected between a first regulating chamber at one end of a regulating valve, and a return conduit to the fluid supplying pump. The control valve has a normal position in which the first regulating chamber is connected with the first consumer outlet, and is separated from the return conduit, and a second position in which the first regulating chamber of the regulating valve is connected with the return conduit, and separated from the first consumer outlet. A second regulating chamber at the other end of the regulating valve cause return of the regulating valve.

In this manner, it is possible to use the control valve as a flow regulating valve with constant and excess fluid delivery, and as a disconnecting valve when the constant flow is interrupted, while the entire supply flow of fluid is directed to the outlet for the excess flow, without throttling. The efficiency of an arrangement with such a control valve is substantially increased as compared with the prior art. However, it is necessary that the pressure in the hydraulic circuit in which constant pressure is to be maintained, does not drop suddenly below the pressure at which the control valve responds, which means that the respective hydraulic circuit must have the effect of the hydraulic accumulator.

One embodiment of the invention comprises supply means for a pressure fluid, such as a pump, regulating valve means having an inlet receiving pressure fluid from the supply means, first and second outlets to consumers, a first regulating chamber containing fluid and biasing means for urging the regulating valve means in one direction to a first regulating position connecting the inlet with the first and second outlets, and a second regulating chamber communicating with the first outlet and receiving fluid therefrom for urging the regulating valve means in the opposite direction to a second regulating position connecting only the second outlet with the inlet; and control valve means having a control inlet communicating with the first outlet, and a return outlet communicating with the supply means for returning fluid to the same.

The control valve means is biased to a first control position connecting the first outlet with the first regulating chamber for holding the regulating valve means in the first regulating position, and being moved to a second control position when the pressure in the first outlet exceeds a predetermined value.

In the second position, the control valve means connect the first regulating chamber with the return outlet so that the pressure fluid in the second regulating chamber moves the regulating valve means to the second regulating position. The biased control valve means returns to the first control position when the pressure in the first outlet drops so that the first regulating chamber is disconnected from the return outlet by the control valve means, and connected with the first outlet whereby the regulating valve means is moved to the first regulating position.

In the preferred embodiment of the invention the control valve means includes a control valve cylinder and a valve slide in the same, biased by a spring to the first control position. The regulating valve means includes a regulating valve cylinder and a regulating valve slide in the same having the first and second regulating chambers at the end thereof. A throttle is provided in the first outlet, and a pressure responsive check valve communicates with the second outlet and connects the same with the return outlet when the pressure in the second outlet exceeds a predetermined pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a schematic sectional view illustrating an embodiment of the invention.

DESCRIPTION OF THE PREFERRED EMBODIMENT

The apparatus 10 by which the flow from two outlets 31 and 33 is controlled, has a housing or valve body 11, provided with a bore forming a regulating valve cylinder 12 in which a regulating valve slide is guided in sealed condition. Regulating valve cylinder 12 has two annular recesses or chambers 14 and 15 forming control edges 16 and 17 respectively cooperating with control edges 18 and 19 of two piston portions 21 and 22 of the regulating valve slide 13.

The control edges 18, 19 of the regulating valve slide 13 have recessed edge portions 23, 24 for making fine adjustments of the flow through the regulating valve. Between the recesses or chambers 14 and 15, an inlet 25 leads to a central cylinder portion. A pump or other pressure fluid supply means 27 has an output connected with inlet 25, and suction means communicating with a schematically illustrated container 27a which is also schematically shown at the lower left corner of the drawing.

A first outlet 31 is divided by a throttle 29 into a first outlet portion 28, and a second outlet portion connected with consumer apparatus. The first outlet portion 28 is connected with chamber 14, and also by a duct 55 with a regulating chamber 56 at one end of the piston portion 21 of the regulating valve slide 13. Chamber 15 is connected to a second outlet 33 for another consumer by a duct 32. As explained hereinafter, outlet 33 may receive either the excess fluid which is not discharged from the first outlet 31, or all the fluid pumped by the pump 27.

The piston portion 22 forms in the regulating valve cylinder 12, a regulating chamber 35 in which a spring 34 is located for biasing the regulating valve slide to the right as viewed in the drawing, while regulating valve chamber 56, receiving pressure fluid through duct 55, urges valve slide 13 in the opposite direction to the left as viewed in the drawing.

The body or housing 11 is provided with another blind bore forming a control valve cylinder 36 in which a control valve slide 37 of the control valve means 38 is guided in sealed condition. A channel 39 connects the closed end of control valve

3 cylinder 36 with the first outlet 31 downstream of throttle 29. At this end of the control valve cylinder 36, a control chamber 54 is provided, and a stop 51 on piston portion 44 of control valve slide 37, prevents the piston portion 44 to move to the end of the control valve cylinder 36. The other end of control valve cylinder 36 is also closed, and forms another control valve chamber 41 in which a biasing spring 42 is located which abuts piston portion 48 to urge the control valve slide 37 to the illustrated control position in which the end of stop 51 abuts the transverse end face of the control valve cylinder. Control valve chamber 41 is connected with a return outlet 43 which leads to the container 27a from which pump 27 pumps the pressure fluid into the inlet 25.

An annular recess 44 surrounds control piston portion 49, and communicates with a transverse duct 53 connected by an axially extending duct 52 with control chamber 54. When control valve slide 37 is in the illustrated control position. The control valve slide 37 has in its central portion, an annular groove 46 separating the piston portions 48 and 49. An annular recess 47 communicates with a duct 46 connected with the first regulating chamber 35, while the annular recess 44 communicates through a duct 45 with the first regulating chamber 35. For the sake of clarity, duct 45 is shown interrupted while actually duct 45 is continuous but crosses duct 46 at a distance. Similarly, duct 39 connecting outlet 31 with control chamber 54, is also schematically shown to be interrupted, although it actually crosses outlet 32, 33.

The return duct 43 is connected by a connecting duct containing a pressure-responsive check valve 57 with the second outlet 33.

OPERATION

The regulating slide 13 and throttle 29 constitute a flow regulating valve which provides pressure fluid for a consumer receiving fluid from the first outlet 31 in the form of a constant flow of pressure fluid, while the excess fluid is directed by the regulating valve to the second outlet 33. In this condition of flow regulating, the control slide 37 of control valve 38 is in the illustrated position, in which the pressure downstream of throttle 29 acts through duct 39, ducts 52, 53, annular recess 44 and duct 45 also in the first regulating chamber 35. The combined pressure of the fluid and spring 34 in regulating chamber 35 holds the regulating valve slide 13 in the illustrated position in which the fluid can flow from inlet 25, chamber 14 and throttle 29 to the first outlet, while the remaining fluid can flow through chamber 17, duct 32 and the second outlet 33 to another consumer.

If the pressure of the constant flow at the first outlet 31 rises above the desired constant value which has been set on control valve 38 by adjusting spring 42, control valve slide 37 is displaced to the left as viewed in the drawing against the force of spring 42. The transverse duct 53 in piston portion 49 is closed and no longer connected with the annular recess 44 and duct 45, while piston portion 48 establishes a connection between control chamber 41, duct 46, and the first regulating chamber 35 with the result that the pressure fluid in the first regulating chamber 35 discharges through the return outlet 43 which is in constant communication with control chamber 41, and connected in the second control position of control valve slide 37 with the annular recess 47.

Due to the storing effect of the hydraulic circuit in which constant pressure is maintained by the fluid from the first outlet 31, and also due to the provision of the throttle 29, the pressure in the second regulating chamber 56 is not suddenly lowered, but is still effective to displace the regulating slide 13 to the left to the second regulating position since the pressure in the first regulating chamber 35 has been reduced, and only the force of spring 34 has to be overcome. In this second regulating position of regulating valve slide 13 the displaced piston portion 21 has moved beyond the control edge 16, and interrupts the connection between inlet 25 and outlet 28, 31. At the same time, the chamber 15 is fully opened and all the pressure fluid flows from inlet 25, chamber 17, and duct 32 out of the second outlet 33 without being throttled. The pressure at the second outlet 33 depends on the adjustment or selection of the pressure responsive check valve 57, and may be smaller or greater than the pressure at which the control valve slide 37 responds.

As long as the pressure in the first outlet 31 does not drop below the pressure at which the control valve 38 responds, control valve slide 37 remains in the second control position, and regulating valve slide 13 remains in the second regulating position displaced out of the positions shown in the drawing.

The pressure in the second regulating chamber 56 cannot move the regulating valve slide to a position abutting the transverse end face of the first regulating chamber 35, since the end of the regulating chamber 35 is closed by piston portion 22 when the same has covered the port of duct 46, and a fluid cushion is formed between piston portion 22 and the end face of the chamber 35.

When the pressure in the hydraulic circuit connected with the first outlet 31 drops below the pressure to which the control valve means 38 was set to respond, the force of spring 42 is sufficient to move control valve slide 37 to the right as viewed in the drawing to the first control position, shown in the drawing, in which stop 51 abuts the end face of control chamber 54. Ducts 52, 53 are connected with the annular recess 44 and duct 45 so that fluid flows into the first regulating chamber 34 and increases the pressure in the same to move the regulating valve slide 13 to the first regulating position illustrated in the drawing. Control valve slide 37 in the new first control position, interrupts the connection between the annular chamber 36 and the control chamber 41 which communicates with the return duct 43 so that no fluid is returned. Finally, the positions illustrated in the drawing are again obtained, and regulating valve slide 13 operates only as flow regulating valve. The principle of the invention may also be applied to regulating valves having a hollow valve slide, and in which the throttle is provided in the valve slide.

It will be understood that each of the elements described above, or two or more together, may also find a useful application in other types of apparatus for controlling the flow from two outlets differing from the types described above.

While the invention has been illustrated and described as embodied in a control valve arrangement in which fluid is supplied at a constant amount through a first outlet, while excess fluid is discharged from a second outlet, and in which all the fluid is discharged through the second outlet if the pressure rises in the first outlet, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and described to be protected by Letters Patent is set forth in the appended claims.

We claim:

1. Apparatus for controlling the flow from two outlets comprising supply means for a pressure fluid; regulating valve means having an inlet receiving pressure fluid from said supply means, first and second outlets, a first regulating chamber, biasing means in said regulating chamber for urging said regulating valve means in one direction to a first regulating position connecting said inlet with said first and second outlets, and a second regulating chamber communicating with said first outlet and receiving fluid therefrom for urging said regulating valve means in the opposite direction to a second regulating position connecting only said second outlet with said inlet; and control valve means having a control inlet communicating with said first outlet, and a return outlet communicating with said supply means for returning fluid to the same, said control valve means being biased to a first control position connecting said first outlet with said first regulating chamber and supplying fluid to the latter for holding said regulating valve means in said first regulating position, and being moved to a second control position when the pressure in said first outlet exceeds a predetermined value, said control valve means in said second position connecting said first regulating chamber with said return outlet and disconnecting said first regulating chamber from said first outlet so that the pressure fluid in said second regulating chamber moves said regulating valve means to said second regulating position, said biased control valve means returning to said first control position when the pressure in said first outlet drops so that said first regulating chamber is disconnected from said return outlet and connected with said first outlet whereby said regulating valve means is moved to said first regulating position.

2. Apparatus as claimed in claim 1 comprising a pressure-responsive check valve connecting said second outlet with said return outlet when the pressure in said second outlet exceeds a predetermined pressure.

3. Apparatus as claimed in claim 1 wherein said control valve means includes a control valve slide, and a control valve cylinder in which said control valve slide moves between said first and second control positions, wherein said control valve slide forms in said control valve cylinder a first control chamber at one end and a second control chamber at the other end of said control valve cylinder, said first control chamber being connected with said first outlet, and said second control chamber being connected with said return outlet, and comprising first and second control conduit means connecting said first regulating chamber with said control valve cylinder, said first control conduit means connecting said first control chamber in said first control position with said first regulating chamber, and said second control conduit means connecting in said second control position said first regulating chamber with said second control chamber and with said return conduit.

4. Apparatus as claimed in claim 3 wherein said control valve cylinder has an annular recess surrounding said control valve slide and communicating with said first control conduit means; and wherein said control valve slide is formed with ducts connecting in said first control position said first control chamber with said annular recess.

5. Apparatus as claimed in claim 4 wherein said control valve slide has an annular recess communicating in said first and second control positions with said second control conduit means, and communicating in said second control position with said second control chamber for connecting said second control conduit means with said return outlet.

6. Apparatus as claimed in claim 5 wherein said regulating valve means includes a regulating valve cylinder and a regulating valve slide movable in said cylinder and forming said first and second regulating chambers at the ends thereof; wherein said inlet and said first and second outlet communicate with said regulating valve cylinder; comprising a throttle means in said first outlet dividing the same into a first outlet portion communicating with said regulating valve cylinder and a second portion adapted to communicate with hydraulic consumer means requiring a constant fluid flow wherein said first outlet portion communicates with said second regulating chamber and said second outlet portion communicates with said first control chamber; and comprising a pressure responsive check valve connecting said second outlet with said return outlet when the pressure in said second outlet exceeds a predetermined pressure.

* * * * *